Oct. 16, 1934.  S. S. MATTHES  1,977,343
CONDUCTOR CONNECTER
Filed March 1, 1933

Inventor
SAMUEL S. MATTHES
By
Attorney

Patented Oct. 16, 1934

1,977,343

UNITED STATES PATENT OFFICE 1,977,343

CONDUCTOR CONNECTER

Samuel S. Matthes, Mansfield, Ohio, assignor to The Ohio Brass Company, Mansfield, Ohio, a corporation of New Jersey Application March 1, 1933, Serial No. 659,051

3 Claims. (Cl. 191—44.1)

My invention relates to trolley wire devices and particularly to splicers or connecters therefor.

The object of my invention is to improve the present splicers by preventing vibration of the trolley wire at the point where the holding means is impressed into the wire, as this is invariably a point of weakness.

My invention resides in the new and novel construction, combination and relation of the parts hereinafter described and shown in the attached drawing.

In the drawing:—

Splicers for trolley wires are of such a character that they almost invariably produce weakness in the trolley wire at the point of splice, that is, the tensile strength and life of the trolley wire at the splice is not equal to that of the trolley wire at a distance from the splice.

Figure 1:
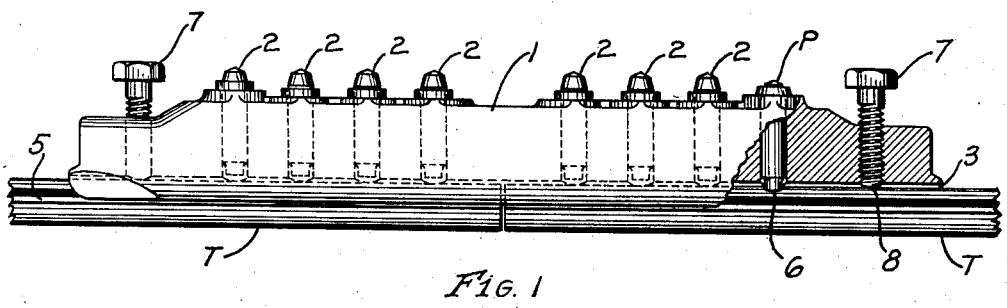
Fig. 1 is a side view in partial section of a well-known splicer with my improvement incorporated therein.
Figure 3:
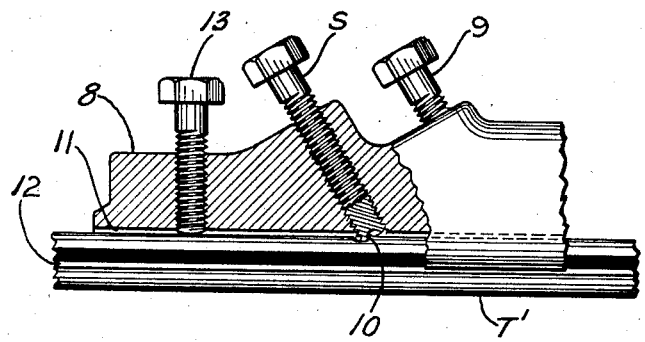
Fig. 3 is a side view in partial section of a portion of another type of splicer having a holding means differing from that in Fig. 1.

This is due to two causes, namely;—first—the holding means if of a mechanical character is seated in the wire and this produce a marked depression or injury to the wire as shown by the pin P depressed into the trolley wire T in Fig. 1 and by the screw S which has its point depressed into the trolley wire T' as in Fig. 3; second—by the vibration set up in the trolley wire relative to the splicer and which is dampened out at the point where the holding member is indented in the trolley wire, that is, at the weakest point of the trolley wire.

In Fig. 1 the splicer comprises a body member 1 provided with a plurality of pins 2 slidably mounted in the body 1 and which compare to the pin P. The pins 2 are represented prior to their being pushed into interlocking engagement with the trolley wire T. The interlocking is brought about by downward pressure on the pin 2 and upward pressure on the trolley wire T by means of a screw clamp thus forcing the pin into the trolley wire as shown by the pin P.

In this type of splicer there is a groove 3 which is cast in position with lips 4 which interengage with the corresponding groove 5 in the trolley wire T. The groove 5 is invariably larger than the trolley wire T so as to permit easy positioning of the trolley wire in the body 1 and taking into account imperfections in the trolley wire.

When the pins have been properly seated in the trolley wire there will be clearance between the trolley wire and the sides of the groove 5 between the extreme pins 2 and pin P and the end of the body 1, and this will permit vibration set up in the trolley wire T to travel back to the end pin 2 or the pin P and in time the trolley wire will be crystallized at the point 6 and the trolley wire will break in due time at this point.

I have found that by preventing the vibrations from traveling back to the point 6 that the life of the trolley wire at the splicer is very much increased and the vibration may be caused to stop at the end of the body 1 if the end of the body is pressed into tight-fitting engagement with the trolley T.

This method, however, has its disadvantages and I have found that the same beneficial results may be secured by means of an adjustable member or screw 7 which I position between the extreme end pin 2 or P and the end of the body 1.

This member 7 is preferably a screw which has a very blunt end 8 which will not injure the wire unless the operator is careless in applying pressure to the screw.

After properly seating the pins 2 and P, the screw 7 is adjusted until the end engages with the surface of the trolley wire T and then sufficient additional pressure is applied to firmly seat the trolley wire T against the inwardly projecting lips 4 thus effectively holding the trolley wire T against movement relative to the body 1 and stopping off vibration before it reaches the pin 2 or the pin P.

Splicers actually installed in the trolley line and laboratory vibration tests upon splicers have proved that the life of the trolley wire at the splicer is very materially increased where the screw 7 is used which does not injure the trolley wire but prevents the vibration from traveling past the screw 7 toward the center of the body.

Referring to Fig. 3, we have the same condition in which the body member 8 is provided with the holding screws 9 and S, the ends 10 of which are cupped and cut their way into the trolley wire T'.

The body 8 is provided with a groove 11 into which the trolley wire is pushed and this groove being larger than the trolley wire permits the same to move and vibrate relative to the body 8. This body is provided with inwardly projecting lips the same as the lips 4 in Fig. 2 and the trolley wire T' is provided with a groove 12 which receives the inwardly projecting lips.

When a splicer, as shown in Fig. 3, is installed the vibrations will concentrate at the point 10 of the end screw S and this is where the break occurs, but if the splicer body is provided with the screw 13, the vibrations are stopped at the screw 13 where there is no injury to the trolley wire and thus the life of the trolley wire is increased or the breakage is put off very materially as compared with the life if the vibrations take place at the point 10 of the screw S.

Figure 2:
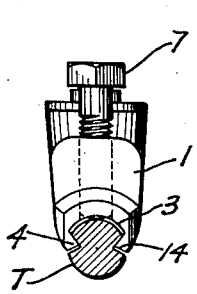
Fig. 2 is an end view of Fig. 1.

The screw 13 should be seated in the same manner as the screw 7, namely, the screw is adjusted until it contacts with the upper surface of the trolley wire T' and only sufficient additional pressure applied to cause the trolley wire to be seated firmly against the upper surface of the inwardly projecting lips, similar to 4 in Fig. 2.

The adjusting screws 7 and 13 can be tightened whenever there is an inspection of the line. In tightening the screws 7 and 13, the trolley wire is forced away from the lower face 14 of the body 1, as shown in Fig. 2.

The members 7 and 13 must be interposed between the end holding member proper and the adjacent end of the body 1 or 8, as the case may be.

As before stated, the ends of the body 1 may be forced into tight contact with the trolley wire T or T' by means of peening or compressing, but I prefer to use the adjustable compressing members 7 and 13.

While I have described and shown my invention as applied to trolley wire connecters, it will be evident that it can also be applied to other devices used with trolley wires as, for instance, trolley frogs, section insulators, crossovers, trolley wire clamps, etc.

Modifications no doubt will suggest themselves to those skilled in the art, therefore, I wish to be limited only by my claims.

I claim:—

1. A wire splicer comprising a body member with a longitudinal slot to receive the ends of the wires to be spliced and pins movable in a transverse direction to the longitudinal axes of the wires to interlock with the wires to prevent relative longitudinal movement of the wires to each other and to the body, means to prevent a bending movement of the wires at the point of interlock between the wires and the pins nearest the ends of the body to prevent crystallization of the wires at said point, the said means comprising members positioned in and at the ends of the body and movable into surface engagement with the wires without penetrating the wire surface to hold the wires at the ends of the body against movement relative to the body.

2. A wire splicer comprising a body member with a longitudinal slot to receive the ends of the wires to be spliced and pins movable in a transverse direction to the longitudinal axes of the wires to interlock with the wires to prevent relative longitudinal movement of the wires to each other and to the body, means to prevent a bending movement of the wires at the point of interlock between the wires and the pins nearest the ends of the body to prevent crystallization of the wires at said point, the said means comprising rotatable members positioned at the ends of the body and transversely movable toward and away from the wires when rotated to make surface engagement only with the wires.

3. A trolley wire device comprising in combination, an elongated body member, a longitudinal groove along one edge to receive the trolley wire, a plurality of aligned members movable transversely to the longitudinal axis of the wire and positioned along the body member, the aligned members arranged to have their ends adjacent the wire to penetrate into the wire to prevent longitudinal movement of the wire relative to the device, means to prevent crystallization of the wire at the point of penetration of the the end aligned member comprising a member positioned in the body adjacent the end thereof and movable transversely to the axis of the wire to engage the same and press the wire against the body without penetrating the wire, to prevent the said crystallization of the wire.

SAMUEL S. MATTHES.